United States Patent [19]

Schäfer et al.

[11] 4,077,989

[45] Mar. 7, 1978

[54] PROCESS FOR THE PRODUCTION OF MODIFIED POLYISOCYANATES

[75] Inventors: Walter Schäfer; Kuno Wagner, both of Leverkusen, Germany

[73] Assignee: Bayer Aktiengesellschaft, Leverkusen, Germany

[21] Appl. No.: 744,585

[22] Filed: Nov. 23, 1976

Related U.S. Application Data

[63] Continuation of Ser. No. 598,105, Jul. 22, 1975, abandoned.

[30] Foreign Application Priority Data

Jul. 30, 1974 Germany .............................. 2436741

[51] Int. Cl.² ........................................... C07C 125/04
[52] U.S. Cl. ......................... 260/404.5; 260/77.5 AT; 260/453 A; 260/453 AB; 260/453 AL; 260/453 AR; 560/158; 560/115; 560/26
[58] Field of Search ..... 260/453 P, 453 AB, 453 AR, 260/453 AL, 471 C, 482 B, 404.5

[56] References Cited

U.S. PATENT DOCUMENTS

| | | | |
|---|---|---|---|
| 3,383,400 | 5/1968 | Meisert et al. | 260/453 AB |
| 3,517,039 | 6/1970 | Wagner et al. | 260/404.5 |
| 3,914,269 | 10/1975 | Nersasian | 260/453 PH |

Primary Examiner—Dolph H. Torrence
Attorney, Agent, or Firm—Gene Harsh; Joseph C. Gil; William E. Parry

[57] ABSTRACT

The instant invention relates to a process for the production of novel modified polyisocyanates containing acylated urea groups and to the products obtained from this process. The process of the instant invention comprises reacting a compound containing isocyanate groups and carbodiimide groups with carboxylic acids in such quantities that from about 0.2 to about 1.2 gram equivalents of carboxyl groups are reacted per gram equivalent of carbodiimide groups.

2 Claims, No Drawings

PROCESS FOR THE PRODUCTION OF MODIFIED POLYISOCYANATES

This is a continuation of application Ser. No. 598,105, filed July 22, 1975, now abandoned.

BACKGROUND OF THE INVENTION

It is known that polyisocyanates can be reacted in the presence of phosphorus-containing catalysts to form polyisocyanate-carbodiimides which are generally substantially insoluble in organic solvents (see, e.g., U.S. Pat. No. 2,941,966). This reaction is accompanied by the evolution of carbon dioxide. The polyisocyanate-carbodiimides thus obtained are partly branched or even crosslinked by adduct formation of carbodiimide groups with isocyanate groups to form uretidindione imines, or even by dimerization of carbodiimide groups to form uretidindione diimines. It is also known that carboxylic acids can be reacted in an addition reaction with isocyanates to form amides and with carbodiimides to form acyl ureas.

Prepolymeric polyisocyanates containing acylated urea groups obtained by the addition of carboxyl groups to carbodiimide groups have not as yet been reported. In fact, it would not be expected that compounds of this kind could be obtained by the addition of carboxyl groups to polyisocyanates containing carbodiimide groups because the undesirable addition reaction between carboxyl and isocyanate groups (i.e., undesirable for the production of these compounds) would be expected to accompany the desirable addition reaction between carbodiimide groups and carboxyl groups. In fact, carboxylic acid anhydrides are known to be formed by the reaction of compounds containing carbodiimide groups with carboxylic acids (see, e.g., F. Kurzer and K. Douraghi-Zadeh, Chem. Reviews 64 107 (1967)).

DESCRIPTION OF THE INVENTION

It has now surprisingly been found that polyisocyanato-carbodiimides and polyisocyanato-polycarbodiimides differing widely in their composition can be directly reacted with carboxylic acids to form polyacyl ureas which are soluble in a variety of different solvents and which may contain different proportions of carbodiimide groups. It is also possible in accordance with this principle of selective addition of carboxylic acids to polyisocyanates containing carbodiimide groups, to obtain new modified polyisocyanates having properties which are extremely beneficial in their subsequent use as components in the synthesis of polyurethane plastics and which, in addition, can be easily adapted to the application envisioned through simple variation of the addition process according to the invention. Thus, for example, the use of fatty acids allows for an increase of the solubility of the products in a polar solvent to a considerable extent.

Another advantage of the instant invention is the fact that additional functional groups can be readily introduced during the carboxylic acid addition to the carbodiimide groups. For example, cross-linkable groups can be built into the molecule by using unsaturated carboxylic acids. The end products of the process according to the invention can be used with advantage for modifying polyurethanes, although they themselves represent relatively high molecular weight compounds which are eminently suitable for producing such products as air-drying coatings, lacquer finishes and impregnations.

The present invention accordingly relates to a process for the production of modified isocyanates wherein compounds containing isocyanate and carbodiimide groups are reacted with carboxylic acids in such quantities that from about 0.2 to about 1.2 gram equivalents of carboxyl groups are reacted per gram equivalent of carbodiimide groups. The invention also relates to the modified polyisocyanate obtained by this process.

Isocyanates containing carbodiimide groups suitable for use in the process according to the invention can be obtained in known manner by subjecting organic polyisocyanates to partial carbodiimide formation. This partial carbodiimide formation is preferably carried out by mixing the polyisocyanate with a suitable carbodiimide forming catalyst, accompanied or followed by heating of the mixture. In general, the carbodiimide-forming reaction takes place at temperatures in the range of from 0° to 220° C. The carbodiimide-forming reaction can be carried out in the absence of or in the presence of suitable inert solvents. The degree of carbodiimide formation reached during the carbodiimide-forming reaction can readily be determined from the quantity of carbon dioxide given off which may be measured by known volumetric methods.

The reaction of the thus obtained carbodiimide polyisocyanate with the organic carboxylic acid is preferably carried out in a one-pot reaction by adding the acid to the reaction mixture when the required degree of carbodiimide formation is reached. The process according to the invention can also be carried out in the absence or in the presence of most solvents. This reaction is generally conducted at reaction temperatures in the range from 0° to 150° C, preferably at temperatures in the range from 20° to 80° C.

Polyisocyanates suitable for use in the process according to the invention include essentially any organic compounds containing at least two isocyanate groups. Preferred polyisocyanates are polyisocyanates corresponding to the general formula:

in which:
Q represents an aliphatic hydrocarbon radical with 2 to 18 carbon atoms, a cycloaliphatic hydrocarbon radical with 4 to 14 carbon atoms, an aromatic hydrocarbon radical with 6 to 14 carbon atoms or an araliphatic hydrocarbon radical with 7 to 14 carbon atoms, and $b$ is an integer from 2 to 3.

The diisocyanates are particularly preferred. It is also possible to use modified polyisocyanates such as, for example, polyisocyanates containing biuret, allophanate, isocyanurate, urethane or carbodiimide groups. Another preferred group of polyisocyanates used in the process according to the invention are reaction products containing isocyanate groups (NCO-prepolymers) of the kind obtained in known manner by reacting the aforementioned polyisocyanates corresponding to the formula

with less than stoichiometric amounts of polyhydroxyl compounds, especially dihydroxy or trihydroxy alkanes, having a molecular weight below 200, or with the polyhydroxy polyesters and polyethers generally known in polyurethane chemistry. Mixtures of the aforementioned polyisocyanates can of course also be used.

Specific examples of polyisocyanates suitable for use in the process according to the invention include, 1,4-tetramethylene diisocyanate; 1,6-hexamethylene diisocyanate; 1,12-dodecane diisocyanate; cyclohexane-1,3- and 1,4-diisocyanate and mixtures of these isomers; 1-isocyanato-3,3,5-trimethyl-5-isocyanatomethyl cyclohexane; 1,3- and 1,4-phenylene diisocyanate; 2,4- and 2,6-tolyene diisocyanate and mixtures of these isomers; m-xylylene diisocyanate; 2,4- and 2,6-hexahydrotolylene diisocyanate and mixtures of these isomers; 4,4'-diisocyanato dicyclohexyl methane; diphenyl methane-4,4'-diisocyanate; naphthylene-1,5-diisocyanate; polyisocyanate containing carbodiimide isocyanate adducts of the type described in German Pat. No. 1,092,007; diisocyanates of the type described in U.S. Pat. No. 3,492,330; polyisocyanates containing allophanate groups of the type described in British Pat. No. 994,890; Belgian Pat. No. 761,626 and published Dutch Patent application No. 7,102,524; polyisocyanates containing isocyanurate groups of the type described in German Pat. Nos. 1,022,789 and 1,027,394 and in German Offenlegungsschrifts Nos. 1,929,034 and 2,004,048; polyisocyanates containing biuret groups of the type described in German Pat. No. 1,101,394, British Pat. No. 889,050 French Pat. No. 7,017,514; polyisocyanates obtained by telomerization reactions of the type described in Belgian Pat. No. 723,640; polyisocyanates containing ester groups of the type described in British Pat. Nos. 956,474 and 1,072,956, aliphatic, cycloaliphatic, araliphatic or aromatic polyisocyanates of the type described by W. Siefgen in Justus Liebigs Annalen der Chemie, 562, pages 75 to 136; reaction products of the aforementioned isocyanates with acetals as described in German Pat. No. 1,072,385 and isocyanates of the type described in German Pat. Nos. 1,022,789 and 1,027,394.

It is generally preferred to use readily available polyisocyanates such as 2,4- and 2,6-tolyene diisocyanate and mixtures of these isomers; and polyphenyl-polymethylene-polyisocyanates of the type obtained by condensing aniline with formaldehyde, followed by phosgenation.

Other preferred isocyanates include 1,3-phenylene dioscyanate; 1,4-phenylene diisocyanate; 4,4'-diisocyanato diphenyl ether; 1,5-naphthylene diisocyanate; 1-methoxy phenyl-2,4-diisocyanate; 4,4'-biphenylene diisocyanate; 3,3'-dimethoxy-4,4'-biphenyl diisocyanate; 3,3'-dimethyl-4,4'-biphenyl diisocyanate and 3,3'-dimethyl diphenyl methane-4,4'-diisocyanate.

Polyhydroxyl compounds suitable for use in the production of NCO prepolymers which are also preferably used in the process of the instant invention include alkane diols and triols having molecular weights below 200, such as ethylene glycol, propylene glycol; hexamethylene diol; glycerol; trimethylol propane; trimethylol ethane or mixtures of these compounds; or polyhydroxyl polyesters or polyethers having molecular weights in the range of from 400 to 4000, of the type obtainable in known manners. The polyhydroxyl polyesters can be prepared by reacting polybasic acids such as adipic acid; phthalic acid; tetrahydrophthalic acid or hexahydrophthalic acid with excess quantities of alkane diols or triols such as those mentioned above. The polyethers can be prepared by alkoxylating suitable starter materials such as water; ammonia; aniline or alkane diols and triols such as those mentioned above with alkylene oxides such as ethylene oxide and/or propylene oxide.

In addition to these preferred NCO prepolymers, it is also possible to use in the process according to the invention, NCO prepolymers of the kind obtained by reacting isocyanates such as those mentioned above with less than stoichiometric amounts of polyester amides, polythioethers, polyurethanes, polyacetals or polycarbonates containing hydroxyl, sulphydryl or amino groups. the molar ratio of NCO-groups to said groups which are reactive with isocyanate groups in the course of the formation of said prepolymers is normally between 2:1 and 15:1 so that mixtures of excess monomeric polyisocyanates and NCO-prepolymers are also encompassed by the term "NCO-prepolymers" used herein.

Carboxylic acids suitable for use in the instant invention include those corresponding to the general formula:

$$R(COOH)_a$$

in which:
R preferably represents a saturated or an olefinically unsaturated aliphatic hydrocarbon radical having 1 to 18 carbon atoms, a saturated or olefinically unsaturated cycloaliphatic hydrocarbon radical having 6 to 19 carbon atoms, an aromatic hydrocarbon radical having 6 to 14 carbon atoms or an araliphatic hydrocarbon radical having 7 to 14 carbon atoms, and a is an integer from 1 to 3 and preferably either 1 tor 2.

Particularly preferred carboxylic acids are those of the above general formula in which R represents an aliphatic hydrocarbon radical having 1 to 18 carbon atoms, and $a = 1$. However, it is emphasized that any organic compound having free carboxyl groups and having no other groups likely to interfere with the reaction according to the invention, are suitable for the process according to the invention. Examples of usable acids include formic acid; acetic acid; chloroacetic acid; phenyl acetic acid; propionic acid; lauric acid; palmitic acid; stearic acid; cyclohexane carboxylic acid; acrylic acid; methacrylic acid; crotonic acid; sorbic acid; 10-undecenic acid; oleic acid; linoleic acid; cinnamic acid; abietic acid; 4-dimethyl amino benzoic acid; monoesters or monoamides of various dicarboxylic acids such as oxalic acid, malonic acid; succinic acid; maleic acid; fumaric acid; phthalic acid and the like, reaction products of $C_4H_9-O-(CH_2-CH_2-O)_{\overline{10-100}}CH_2-CH_2-OH$  with cyclic anhydrides to form high molecular weight monocarboxylic acid semiesters; and polycarboxylic acids such as oxalic acid, malonic acid, maleic acid, succinic acid, glutaric acid, adipic acid, suberic acid, azelaic acid, phthalic acid, sebacic acid, 2,2,4- and 2,4,4-trimethyl adipic acid, heptadecane-1,8- and 1,9-dicarboxylic acid, fumaric acid, benzene-1,3- and 1,4-dicarboxylic acid, 1,2,2-trimethyl cyclopentane-1,3-dicarboxylic acid and the like.

Carbodiimide-forming catalysts are known in the art and are described in U.S. Pat. Nos. 2,941,966; 2,853,518 and 2,853,473, the disclosures of which are herein incorporated by reference. The catalyst which is preferably used in a mixture of 1-methyl-1-phospha-2-cyclopenten-1-oxide and 1-methyl-1-phospha-3-cyclopenten-1-oxide. In addition to those specific phosphorus compounds it is also possible to use other known carbodiimide-forming catalysts known per se and described in the above patents.

In one preferred embodiment of the production of the polyisocyanate-polycarbodiimide polyaddition product, diisocyanates (preferably aromatic diisocyanates) are subjected to carbodiimide formation with 1/100 to 2/10 of the molar amount of the diisocyanate of phospholine oxide at temperatures in the range from 0° to 200° C. In order to obtain end products which are stable in storage at room temperature, the carbodiimide-forming reaction is preferably carried out at temperatures in the range from 100° to 200° C in the presence of catalysts such as triphenyl phosphinoxide, which only develop their catalytic activity at temperatures in this elevated range. After the evolution of carbon dioxide has reached 50 to 95% of the theoretical (100% means complete conversion of the NCO groups into carbodiimide groups), the carboxylic acid of the general formula: R—(COOH)$_a$, is added dropwise. The quantity in which this acid is added is selected in such a way that there are from about 0.2 to about 1.2 and preferably from about 0.5 to about 1.0 gram-equivalents of carboxyl groups per gram-equivalents of carbodiimide groups.

Aliphatic and cycloaliphatic diisocyanates also react to form polycarbodiimides, although in their case temperatures above 100° C are generally necessary in order to obtain a conversion comparable to that obtained in the case of aromatic isocyanates.

As already mentioned, both the carbodiimide-forming reaction and the addition reaction according to the instant invention can be carried out in the presence of or in the absence of solvents. Examples of suitable solvents include benzene, toluene, xylene, cyclohexane, tetralin, chlorobenzene, o-dichlorobenzene, dimethyl formamide, methylene chloride, chloroform, perchloroethylene, ethyl acetate, butyl acetate, diethylene glycol dimethyl ether, tetrahydrofuran, isopropanol, tert.-butanol, acetone, methyl ethyl ketone, methyl isopropyl ketone, cyclohexane, methylene, and mixtures thereof. The polyisocyanate polyaddition product prepared in the absence of solvents often hardens to form a hard foam which, when ground into a powder, dissolves even after several days' storage at room temperature in such solvents as toluene, xylene, methylene chloride, o-dichlorobenzene or dimethyl formamide.

The process according to the invention allows for the production of modified polyisocyanates whose physical and service properties, such as hydrophobicity, hydrophilicity, solubility and reactivity with compounds containing isocyanate-reactive hydrogen atoms are widely varied. Similarly, the properties of the polyurethanes ultimately obtained from the new polyisocyanates (e.g. hardness and/or thermoplasticity) can readily be varied within a wide range by suitably selecting the starting isocyanates, degree of carbodiimide formation and/or the type and quantity of carboxylic acid added. Thus, for example, the solubility of polycarbodiimides containing isocyanate groups in organic solvents can be readily increased by utilizing a long-chain fatty acid as the acid component. Thermoplastic polyurethanes can be obtained in particular when relatively long-chain difunctional NCO prepolymers are used in the carbodiimide-forming reaction.

In cases where the quantity of gram equivalents of carboxyl groups used, based on the carbodiimide groups present is less than one, modified polyisocyanates still containing free carbodiimide groups are obtained. Since carbodiimides are known to stabilize plastics containing ester groups against the effect of heat and moisture, isocyanates of this kind are eminently suitable for the production of polyester urethanes having built-in ester stabilizers. Reaction of the isocyanates containing carbodiimide groups with polycarboxylic acids, especially dicarboxylic acids, in quantities corresponding to a molar ratio of carboxyl groups to carbodiimide groups of greater than 1.2 results in the formation of relatively high molecular weight reaction products with the polyisocyanate products of the instant invention formed as intermediates. If the polycarboxylic acids are used in very high quantities, e.g., such that there is one or more carboxyl group available for each carbodiimide group and for each isocyanate group, high molecular weight polyaddition products free from isocyanate groups are formed.

The preferred end products of the process of the instant invention are characterized by (a) an —NCO group content of from about 0.5 to about 25% by weight and preferably from about 3 to about 21% by weight, (b) a

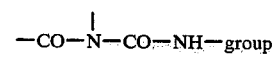

content of from about 0.5 to about 50% by weight and preferably from about 3 to about 21% by weight, and (c) an —N=C=N- group content of from 0 to about 25% by weight, and preferably from about 0.3 to about 12% by weight.

The NCO-content of the end products of the process according to the invention can be quantitatively determined by the titration method known per se using a secondary amine such as dibutyl amine. The product of the process is dissolved in an inert solvent such as, o-dichlorobenzene and is then reacted at room temperature with an excess of dibutyl amine. The amine consumption which can subsequently be determined by titration corresponds to the quantity of isocyanate groups present in the final product. Guanidine groups are formed from the carbodiimide groups and the secondary amine and can also be titrated (for example, with hydrochloric acid) but they do not enter the overall balance of the titrimetric NCO-determination.

In order to determine the carbodiimide groups, reaction of the products with secondary amine (diethyl amine) is followed by removal of the amine excess and solvent by distillation. The guanidine groups formed are then quantitatively determined directly by titration, for example, with hydrochloric acid. This titration is not affected by the urea groups formed (isocyanate groups plus secondary amine).

The acylated urea group content of the products of the instant process can be calculated from the difference in the carbodiimide content before and after the reaction with carboxylic acids. The fact that, in the process according to the invention, the reaction leading to acyl urea groups also takes place between the carbodiimide groups and the carboxyl groups, can be seen from the IR-bands at 1720 cm$^{-1}$ and 1660 cm$^{-1}$ which can always be observed in the products of the instant invention and which are typical of the acyl urea group.

The products of the invention are suitable for use as starting materials in the production of polyurethane plastics by the isocyanate polyaddition process. High-quality plastics are obtained by the chain-extending reaction known per se with suitable chain extenders. The end products of the process according to the invention can preferably be used in the production of coatings and lacquer finishes by the isocyanate polyaddition process.

The invention is further illustrated but is not intended to be limited by the following examples in which all parts and percentages are by weight unless otherwise specified.

EXAMPLE 1

34 parts by weight (0.02 mol) of an adipic acid-1,6-hexanediol neopentyl glycol polyester having an OH number of 65 are dehydrated for 30 minutes in a water jet pump vacuum at a temperature of 120° C and subsequently left to react for 30 minutes at that temperature with 34.8 parts by weight (0.2 mol) of a mixture of 2,4- and 2,6-tolylene diisocyanate in a ratio of 8:2 (NCO-content of the resulting mixture 21.8% by weight). After dilution with 69.2 parts by weight of toluene, 0.5 parts by weight (4.3 mMol) of a mixture of 1-methyl-1-phospha-2-and -3-cyclopenten-1-oxide are added. After 3.1 l of $CO_2$ (0.138 mol) have been given off, 25 parts by weight (0.125 mol) of lauric acid in 28 parts by weight of toluene are added by dropwise addition at room temperature. A 48% solution of a polyisocyanate polycarbodiimide polyacyl urea having free NCO groups is obtained. This solution is applied to a substrate, and following evaporation of the solvent by reaction with atmospheric moisture, a clear elastic film remains.

Analysis of the dissolved product (all percentages are based on resin solids):

| | |
|---|---|
| —NCO: | 3.5% by weight |
| —N=C=N—: | 0.9% by weight |
| —CO—N—CO—NH—: <br> \| | 11.5% by weight |

EXAMPLE 2

The reaction is carried out in the same way as in Example 1, except that 8.9 parts by weight (5 mMol) of the adipic acid-1,6-hexanediol-neopentyl glycol-polyester are replaced by 0.52 parts by weight (5 mMol) of 2,2-dimethyl-1,3-propanediol. The resulting solution is applied to a substrate, and following evaporation of the solvent by reaction with atmospheric moisture at room temperature, a clear hard film remains.

Analysis of the dissolved product (all percentages are based on resin solids):

| | |
|---|---|
| —NCO: | 3.1% by weight |
| —N=C=N—: | 1.6% by weight |
| —CO—N—CO—NH—: <br> \| | 11.1% by weight |

EXAMPLE 3

34.8 parts by weight (0.2 mol) of a mixture of 2,4- and 2,6-tolylene diisocyanate (ratio 8:2) are dissolved in 81.2 parts by weights of toluene, and the resulting solution subjected to carbodiimide formation with 0.5 parts by weight of mixture of 1-methyl-1-phospha-2- and 3-cyclopenten-1-oxide. After 2.2 liters of carbon dioxide have been given off, 7.3 parts by weight (0.05 mol) of adipic acid in 7 parts by weight of dimethyl formamide are added dropwise. The resulting solution is applied to a substrate and following evaporation of the solvent by reaction with atmospheric moisture at room temperature a scratch proof slightly brittle film remains.

Analysis of the dissolved product (all percentages based on the resin solids):

| | |
|---|---|
| —NCO: | 21.0% by weight |
| —N=C=N—: | <1.0% by weight |
| —CO—N—CO—NH—: <br> \| | 20.5% by weight |

EXAMPLE 4

34.8 parts by weight (0.2 mol) of a mixture of 2,4-and 2,6-tolylene diisocyanate (ratio of 8:2) are subjected to carbodiimide formation with 0.4 parts by weight (3.4 mMol) of a mixture of 1-methyl-1-phospha-2- and -3-cyclopenten-1-oxide. After 1 liter of carbon dioxide has been given off, 10 parts by weight (0.05 mol) of lauric acid are slowly stirred into the liquid. After 24 hours, a hard foam is obtained which can readily be ground into a powder.

The powder is dissolved in toluene and following evaporation of the solvent at room temperature by crosslinking with atmospheric moisture, a clear hard, slightly brittle film remains.

Analysis of the dissolved product (all percentages based on resin solids):

| | |
|---|---|
| —NCO: | 5.0% by weight |
| —N=C=N—: | 12.0% by weight |
| —CO—N—CO—NH—: <br> \| | 11.5% by weight |

EXAMPLE 5

63.8 parts by weight of a biuret polyisocyanate, consisting essentially of tris-(isocyanatohexyl)-biuret, having an NCO-content of 16% by weight, 34.8 parts by weight (0.2 mol) of a mixture of 2,4- and 2,6-tolylene diisocyanate (ratio of 8:2) are dissolved in 100 parts by weight of xylene and the resulting solution subjected to carbodiimide formation at 20° C with 0.4 parts by weight (3.5 mMol) of 1-methyl-1-phospha-2- and -3-cyclopenten-1-oxide. After 3 liters of carbon dioxide have been given off, 27 parts by weight (0.13 mol) of laruic acid in 40 parts by weight xylene are added dropwise. The resulting solution is applied to a substrate, and following evaporation of the solvent by reaction with atmospheric moisture at room temperature, a clear hard film remains.

Analysis of the dissolved product (all percentages are based on resin solids):

| | |
|---|---|
| —NCO: | 8.0% by weight |
| —N=C=N—: | 2.4% by weight |
| —CO—N—CO—NH—: <br> \| | 9.1% by weight |

EXAMPLE 6

44.4 parts by weight (0.2 mol) of 1-isocyanato-3,3,5-trimethyl-5-isocyanatomethyl cyclohexane are dissolved in 103 parts by weight of o-dichlorobenzene and subjected to carbodiimide formation at 150° C with 0.5 parts by weight (4.3 mMol) of a mixture of 1-methyl-1-phospha-2- and -3-cyclopenten-1-oxide.

After 2.2 liters of carbon dioxide have been given off, 20.2 parts by weight (0.1 mol) of sebacic acid in 47 parts by weight of o-dichlorobenzene are added dropwise. The resulting solution is applied to a substrate, and following evaporation of the solvent by reaction with atmospheric moisture at room temperature, an extremely brittle film remains.

Analysis of the dissolved product (all percentages are based on resin solids):

| —NCO: | 13.8% by weight |
|---|---|
| —N=C=N—: | 0.4% by weight |
| —CO—N(|)—CO—NH—: | 13.8% by weight |

What is claimed is:

1. A process for the production of modified isocyanates containing urethane groups, having an NCO-content of from about 0.5 to about 25% by weight, a

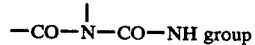

content of from about 0.5 to about 50% by weight, and an —N=C=N— group content of from about 0 to about 25% by weight, said process comprising
    (a) reacting alkane diols or triols having molecular weights below 200 or polyhydroxyl polyesters or polyethers having molecular weights in the range of from 400 to 4000 with organic polyisocyanates in a molar ratio of NCO-groups to hydroxyl groups of from 2:1 to 15:1 to provide NCO-prepolymers having urethane groups,
    (b) subjecting said NCO-prepolymers to partial carbodiimide formation wherein from 50 to 95% of the NCO groups of said NCO-prepolymers are converted to carbodiimides, and
    (c) reacting the products of step (b) with carboxylic acids the quantities of (b) and (c) being such that from 0.2 to 1.2 gram equivalents carboxylic groups are reacted per gram equivalent of carbodiimide groups.
2. The product of the process of claim 1.

* * * * *